United States Patent [19]

Droho

[11] Patent Number: 5,103,153
[45] Date of Patent: Apr. 7, 1992

[54] CONTROL EQUIPMENT FOR MULTI-SPEED ELECTRIC MOTORS

[75] Inventor: Joseph S. Droho, Chicago, Ill.

[73] Assignee: North American Philips Corporation, New York, N.Y.

[21] Appl. No.: 266,535

[22] Filed: Nov. 2, 1988

[51] Int. Cl.⁵ ............................................. H62P 7/48
[52] U.S. Cl. .................................... 318/777; 318/775
[58] Field of Search ................ 318/788, 783, 775–777, 318/816, 817

[56] References Cited

U.S. PATENT DOCUMENTS

| | | | |
|---|---|---|---|
| 1,024,635 | 4/1912 | Kunkel | 318/753 |
| 2,203,927 | 6/1940 | Rutherford et al. | 318/783 |
| 3,593,081 | 7/1971 | Forst | |
| 3,600,656 | 8/1971 | Gramkow | |
| 4,118,753 | 10/1978 | Vind | |
| 4,500,825 | 2/1985 | Schemann | |

FOREIGN PATENT DOCUMENTS

| | | |
|---|---|---|
| 0087173 | 8/1983 | European Pat. Off. |
| 0044244 | 9/1984 | European Pat. Off. |
| 1002871 | 8/1957 | Fed. Rep. of Germany |
| 2819154 | 11/1979 | Fed. Rep. of Germany |
| 2821253 | 5/1980 | Fed. Rep. of Germany |
| 2947133 | 6/1980 | Fed. Rep. of Germany |
| 3105444 | 7/1982 | Fed. Rep. of Germany |
| 3202965 | 8/1983 | Fed. Rep. of Germany |
| 1194809 | 6/1970 | United Kingdom |
| 2102217 | 1/1983 | United Kingdom |

OTHER PUBLICATIONS

JP-Kokai 59-35593 Converting Method for Number of Poles in Induction Motor.
JP-Kokai 56-12875 Single-Phase Induction Motor.

*Primary Examiner*—David Smith, Jr.
*Attorney, Agent, or Firm*—Robert T. Mayer

[57] ABSTRACT

Control equipment for motors having two windings and wherein both windings are temporarily connected in parallel to start the motor.

8 Claims, 1 Drawing Sheet

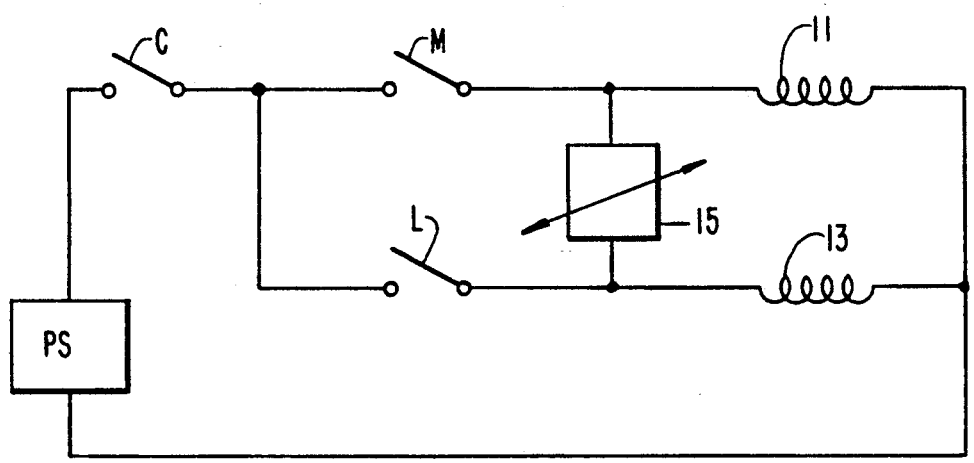

CONTROL EQUIPMENT FOR MULTI-SPEED ELECTRIC MOTORS

This is an invention in the electrical art. More particularly it involves apparatus for controlling the starting of electrical motors having more than one speed winding.

One of the objects of the invention is to enable multi-speed motors to start to rotate when they otherwise might stall.

An advantage of the invention is the fact that a multi-speed motor cannot be inadvertently turned on with only a non-self-starting winding in circuit whereupon it can stall and constitute a fire hazard.

One of the features of the invention is the use of a positive temperature coefficient resistor to connect temporarily a sufficient number of windings of a multi-winding motor to a power source to insure that the motor is self-starting when it is desired to have the motor operate at a speed provided by a non-self-starting winding.

In carrying out the invention there is provided control equipment for a multiple speed electrical motor having a first speed winding and a second speed winding. The control equipment includes selection means for connecting the first speed winding to a power source and the second speed winding to the power source. Also provided are control means operable when one of the speed windings is connected to the power source by the selection means for temporarily connecting the other speed winding to the power source.

Other objects, features and advantages of the invention will be apparent from the following description and amended claims when considered in conjunction with the accompanying drawing in which:

The sole figure is a schematic circuit diagram with the windings of a multi-speed motor connected in accordance with the invention.

Referring specifically to the drawing there is shown a medium speed winding 11 and a low speed winding 13 of a multi-speed motor not otherwise illustrated. A first end of medium speed winding 11 is connected to a first end of power source PS through manually operable switch M and manually operable common switch C. A first end of low speed winding 13 is connected to the first end of power source PS through manually operable switch L and manually operable common switch C. The other end of power source PS is connected to the other ends of windings 11 and 13.

Common switch C represents for example, a wall switch which controls a fan driven by the disclosed multi-speed motor.

Positive temperature coefficient resistor 15 interconnects the first ends of windings 11 and 13. Manually operable switches M and L comprise a selection means for connecting the medium speed and low speed windings to power source PS. Positive temperature coefficient resistor 15 comprises a control means which is operable when low speed winding 13 is connected by the selection means to the power source for temporarily connecting medium speed winding 11 to the power source also. In this way should low speed winding 13 not generate sufficient torque to rotate the revolving part of the motor sufficient current would temporarily flow through switches C and L, positive temperature coefficient resistor 15 and medium speed winding 11 to overcome the inertia of the revolving part and start it rotating. As positive temperature coefficient resistor 15 heats up, as those skilled in the art will understand, it will present a high resistance to the flow of current and consequently effectively cut-off current to medium speed winding 11.

As will be understood should switch M be closed to connect medium speed winding 11 to power source PS, current will also flow in low speed winding 13 temporarily until positive temperature coefficient resistor 15 heats up sufficiently to present a virtual open circuit between switch M and low speed winding 13. This, of course, will guarantee that if medium speed winding 11 does not alone generate sufficient torque to rotate the revolving part of the motor that low speed winding 13 adds its torque in starting to insure rotation.

It will also be understood that should both switches M and L be closed as well as common switch C the motor will rotate at a higher speed than if only medium speed switch M and common switch C are closed.

With resistor 15, if common switch C is employed to turn off the motor, stalling is avoided when switch C is next closed since both windings are connected to power source PS.

It should be apparent that modifications of the above will be evident to those skilled in the art and that the arrangement described herein is for illustrative purposes and is not to be considered restrictive.

What is claimed is:

1. Control equipment for a multiple speed electrical motor with a first speed winding means for operating said motor at a first speed and a second speed winding means for operating said motor at a second speed different than said first speed including manually operative selection means for selectively connecting said first speed winding means to a power source or said second speed winding means to said power source and control means operable when one of said speed winding means is connected by said selection means to said power source for temporarily connecting said other of said speed winding means to said power source.

2. Control equipment as in claim 1, wherein said manually operative control means includes is a positive temperature coefficient resistor.

3. Control equipment as in claim 2, wherein said manually operative selection means includes a first manually operative switch in series circuit with said first speed winding means and a second manually operative switch in series circuit with said second speed winding means.

4. Control equipment as in claim 3, wherein said positive temperature coefficient resistor connects said first speed winding means to said second speed winding means.

5. Control equipment as claimed in claim 1, including a switch which when closed connects one of said speed winding means to said power source, said motor being turned on whether said first speed winding means or said second speed winding means is connected to said power source when said switch is closed.

6. Control equipment as in claim 5, wherein said control means is a positive temperature coefficient resistor.

7. Control equipment as in claim 6, wherein said manually operative selection means includes a first manually operative switch in series circuit with said first speed winding means and a second manually operative switch in series circuit with said second speed winding means.

8. Control equipment as in claim 7, wherein said positive temperature coefficient resistor connects said first speed winding means to said second speed winding means.

* * * * *